Oct. 4, 1927.

C. LE G. FORTESCUE 1,644,467

REGULATOR SYSTEM

Filed Sept. 1, 1921

WITNESSES

INVENTOR
Charles L. G. Fortescue.
BY
ATTORNEY

Patented Oct. 4, 1927.

1,644,467

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed September 1, 1921. Serial No. 497,757.

My invention relates to regulator systems, and it has special relation to systems for maintaining the exciting flux of a dynamo-electric machine substantially constant.

The present application is a continuation in part of my application, Serial No. 290,935, filed Apr. 18, 1919.

One object of my present invention is to provide a system of the above-indicated character which shall be responsive to current changes that are initiated in the field-magnet winding circuit of a dynamo-electric machine by variations in the load current which is being supplied by the armature thereof.

Another object of my invention is to provide a system of the above-indicated character which shall comprise an exciter adapted to generate an electromotive force directly proportional to the load current and assisting the currents induced in the main field-magnet winding which constitutes the load of the exciter.

A further object of my invention is to provide a system of the above-indicated character which shall comprise a series-connected exciter and means for determining the range of operation of said exciter.

A still further object of my invention is to provide a system of the above-indicated character which shall maintain a predetermined resistance value in the exciting circuit of a dynamo-electric machine.

In any generator, either direct-current or alternating-current, there is an inherent tendency to maintain a constant electromotive force with fluctuating loads, especially if the armature reactance is low. That is to say, the field-magnet windings of the generator will receive a current impulse, whenever there is a load change upon the machine, which will tend to maintain a constant exciting flux within the machine.

The present invention contemplates using the above-mentioned current impulse to initiate a corresponding change in the excitation of the machine field-magnet winding.

More specifically, the present invention comprises connecting an exciter, the field-magnet winding and armature of which are connected in series relation with each other, in series relation with the field-magnet winding of an alternating-current generator. It has been found desirable to provide a regulator which will maintain the resistance value of the exciting circuit within predetermined limits, i. e., at the critical operating point of the exciter machine.

Reference may now be had to the accompanying drawings, in which

Figure 1:
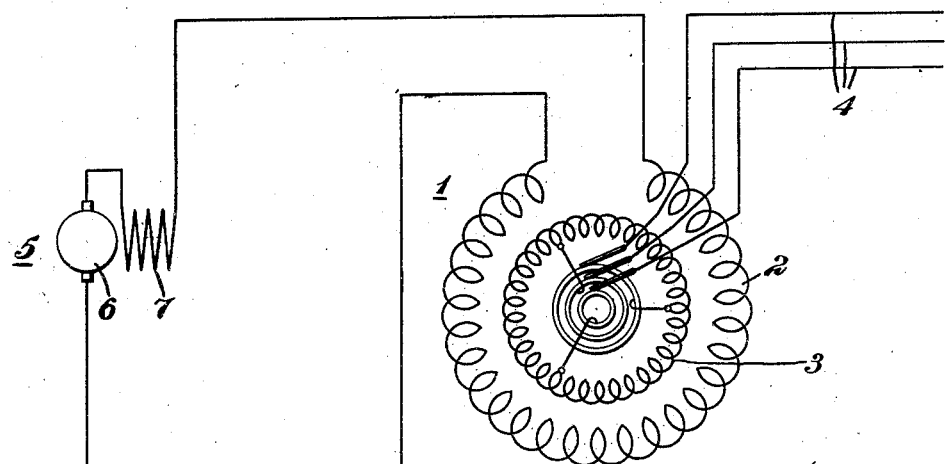
Figure 2:
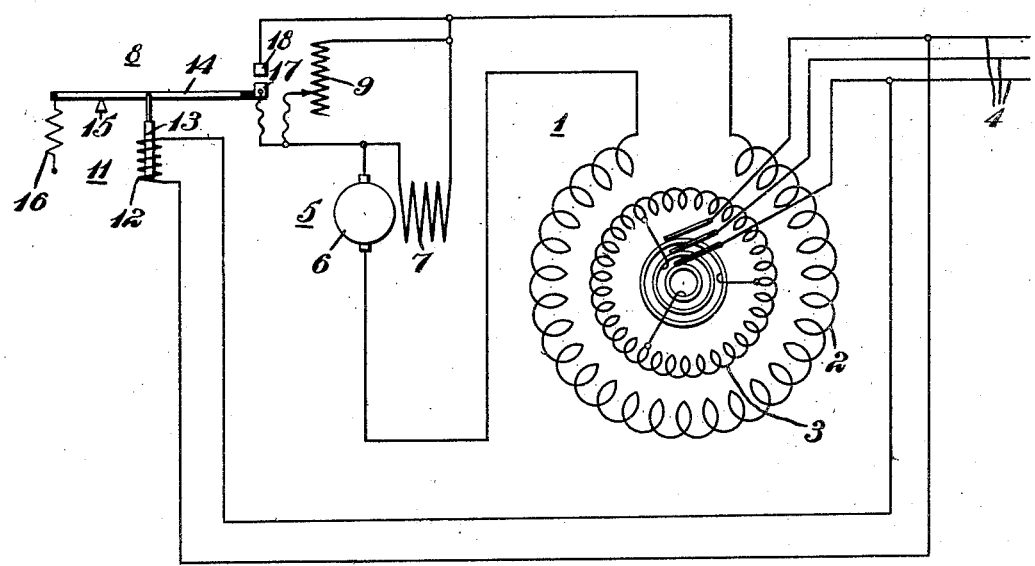

Figure 1 is a diagrammatic illustration of circuits and apparatus embodying the present invention, and Fig. 2 is a diagrammatic illustration of the circuits and apparatus embodying my invention, including a regulator co-operating with the excitation circuit.

An alternator 1, comprising a field-magnet winding 2 and an armature winding 3, is illustrated as supplying energy to a load through supply conductors 4.

Connected in series relation with the field-magnet winding 2 is an exciter 5 comprising an armature 6 and a field-magnet winding 7. It will be noted that the armature 6 and the field-magnet winding 7 are connected in series relation with each other and that the exciter, as a whole, is connected in series relation with the field-magnet winding 2.

It is well known that, if an increase in load occurs upon the generator 1, there will be an increase in the load current of the armature 3 which will affect the flux of the field-magnet-winding circuit, thereby causing a current to tend to flow in the field-magnet winding which will, if maintained, substantially compensate for the increased current drawn from the armature 3. With a series-connected exciter in series relation with the field-magnet winding 2, such an increased current in the field-magnet winding will, in the present case, result in an increase in the field strength of the winding 7 of the exciter 5. The increased strength of the field-magnet winding 7 will cause an increased electromotive force to be generated by the armature 6 which will be impressed upon the field-magnet winding 2 and result in an increase of exciting current therein that is directly proportional to the initial current impulse therein. In other words, the present invention provides an exciting system for a dynamo-electric machine which is responsive to the electrical changes within the machine to vary the excitation thereof to maintain a substantially constant flux and hence a substantially constant voltage.

It will, perhaps, be advantageous to explain more in detail the characteristics of the excitation circuit and the functioning of the apparatus referred to above. It has been found that a series direct-current machine may be designed to have, at a given speed, the characteristic of generating an electromotive force directly proportional to the current over a wide range of values, especially when applied to circuits in which the current or impedance drop thereof is subject to change.

The field-magnet-winding circuit of the machine to be controlled has a varying impedance drop which is determined by several factors, among them being the currents traversing the winding. Furthermore, the flux between the field-magnet windings and the armature is determined partly by the armature reaction when variations in the load currents occur. Assuming, as above, that there is an increase in the load supplied by the generator, such an increase in load will initiate, in the field-magnet winding, a current proportional to the load change and of a character to maintain the flux of the generator constant. Obviously, the increased current varies the impedance drop of the field-magnet winding circuit proportional to the load change.

Normally, the series exciter will generate an electromotive force directly proportional to the impedance drop of the field-magnet-winding circuit. An increase in current in the main field-magnet winding, as described above, will increase the field strength of the series exciter to generate an electromotive force which is still opposite to the impedance drop of the excitation circuit. The exciter thereby becomes what may be termed a "negative impedance" device, that is to say, a device which produces a voltage directly proportional to the current and having a definite phase angle with respect to the current changes in a circuit to which the negative impedance device is connected.

It should be noted that such a device will not generate when the external resistance of the circuit to which it is connected is greater than the negative resistance of the device. In case the value of the resistance of the circuit to which the device is connected becomes greater than the negative resistance thereof, while the device is generating, the voltage generated will gradually decrease until it becomes zero and will thereafter remain at zero. On the other hand, if the resistance value of the circuit is less than the negative-impedance value of the device, the voltage thereof will build up and the current will continue to increase until the internal negative resistance thereof, by reason of the saturation of the iron, has become equal to the external resistance of the circuit. However, if the resistance of the circuit is just equal to the negative impedance of the generating device, the circuit will have an effective impedance of zero. There will be no force tending to alter the magnitude of a current circulating therein, and the current value will depend solely upon external influences, such as load variations.

It will be apparent that the series exciter is operating at what may be termed a "critical-resistance" point, above or below which the exciter will either build up to saturation or become ineffective. Furthermore, because of the impossibility of designing a dynamo-electric machine wherein the armature winding and the field-magnet windings thereof magnetically coincide, that is, wherein the angle between field flux and the armature flux is zero, the corrective current generated by the negative-impedance device may not be equal, in magnetizing effect, to the differential current in the armature caused by the change in load. It is, therefore, desirable to provide means for bringing the exciting current up to such value that the decoupling effect occasioned by the separation of the armature and field-magnet windings, that is, the variation from zero of the armature and field fluxes, shall be substantially compensated for.

Accordingly, in the system illustrated in Fig. 2, a regulator 8 is provided for maintaining the resistance or impedance value of the excitation circuit within predetermined limits. The regulator comprises a resistor 9 which is connected in parallel relation to the field-magnet winding 7 of the series exciter 5, an electromagnet 11, having an energizing coil 12 connected across the supply conductors 4, and a core armature 13. The armature 13 operates a lever 14, pivoted at 15 and having co-operating therewith a spring 16 that is adapted to oppose the pull of the electromagnet 11. The lever 14 carries a contact member 17 that co-operates with stationary contact member 18 to complete a shunt circuit about the resistor 9, or so much thereof as may be included in the excitation circuit.

The resistor 9 is, accordingly, a part of the excitation circuit and may be considered as a part of the impedance thereof. The resistor is adapted to have an effective value sufficient to maintain the proper operating characteristic of the exciter 5 whereby the exciter 5 will be effective to maintain the effective resistance of the excitation circuit of the generator 1 substantially constant, with fluctuating loads.

It will be apparent that, if the regulator 8 is of the vibratory type and the position of the core armature 13 varies, the position of the contact member 17 to vary the length of contact engagement, the effective value of the resistor 9 will be controlled in accordance with the load variations. Accordingly, the impedance of the exciting circuit is maintained proportional to the load variation, and, hence, proportional to the increased or decreased exciting electromotive force, thereby maintaining the exciter within the proper operating limits thereof.

What has been said herein with reference to an increase in load applies equally well but conversely, whenever a decrease in load occurs.

It should be observed that, when an alternator of the single-phase type is excited in the manner hereinbefore described, it may be desirable to have the exciter constitute a portion of the damper windings which are usually associated with such alternators.

The present invention has been particularly described with reference to only one system and one method of applying the discovery made. Numerous other methods based upon the present invention may be evolved. However, such modifications in the system and arrangement and location of parts are within the spirit and scope of my invention, and are intended to be covered by the appended claims.

I claim as my invention:—

1. The combination with a dynamo-electric machine comprising an armature and a field-magnet winding, of a series-connected exciter in series relation with said field-magnet winding, and regulating means associated with said exciter comprising a resistor in parallel relation to said exciter field-magnet winding, and electromagnetic means controlling a shunt circuit for said resistor.

2. The combination with a dynamo-electric machine comprising an armature and a field-magnet winding, of an exciter connected in series relation with said field-magnet winding and having an armature and a field-magnet winding connected in series relation, and regulating means comprising a resistor in parallel relation to said exciter field-magnet winding and electromagnetic means adapted to control the effective value of said resistor.

3. The combination with a synchronous machine and a transmission line connected thereto, said line being subject to disturbances tending to suddenly alter the machine flux, of electro-responsive means for variably exciting said synchronous machine in such manner that an effective corrective change in excitation is applied to said synchronous machine in response to each line disturbance in a time which is less than the time required for the termination of the flux-changing transient in said machine, whereby the flux in said machine is maintained substantially constant in spite of said line disturbances.

4. The combination with a synchronous machine and a transmission line connected thereto, said line being subject to disturbances tending to suddenly alter the machine voltage, of electro-responsive means for variably exciting said synchronous machine in such manner that an effective corrective change in excitation is applied to said synchronous machine in response to each line disturbance in a time which is less than the time required for the termination of the voltage-changing transient in said machine, whereby the voltage is restored to substantially normal value before the termination of the armature-reaction effects resulting from any line disturbance.

5. The combination of a main dynamo-electric machine having a field-magnet winding and an armature, an electrical system connected to the terminals of said armature, an exciting machine comprising an armature and a serially connected field-magnet winding, said exciting machine being connected in series circuit relation to the field-magnet winding of said main machine, and auxiliary means including a vibratory regulator normally operative to maintain the exciter current at intermediate values between zero and the maximum value which would correspond to a saturated condition of the exciting machine.

6. The combination with an alternating-current line and a synchronous machine connected thereto and having a direct-current exciting winding, of an exciter therefor, said exciter having a series exciting winding of such strength as to cause said exciter to have a negative-impedance characteristic, and auxiliary means including a vibratory regulator normally operative to maintain the exciter current at intermediate values between zero and the maximum value which would correspond to a saturated condition of the exciter.

7. The combination with a synchronous machine, of a series exciter machine therefor having only a series field excitation, and auxiliary means including a vibratory regulator normally operative to maintain the exciter current at intermediate values between zero and the maximum value which would correspond to a saturated condition of the exciter.

8. The combination with a circuit subject to sudden induced current changes, of negative-impedance means connected in series relation thereto for sustaining said sudden induced current changes, and auxiliary means including a vibratory regulator normally operative to maintain the current in said circuit at intermediate values between substantially zero and the maximum value of which said negative-impedance means is capable.

9. The combination with a circuit subject to sudden induced current changes, of a series commutator type dynamo-electric machine, connected in series relation thereto and having an exciting winding in series with said circuit, and regulating means normally operative to limit the range of operation of said machine to intermediate voltage values between substantially zero and the maximum value of which the machine is capable.

10. The combination with an alternating-current system including a synchronous machine comprising an armature and a direct-current exciting winding, the current in which tends to follow variations in flux conditions in the synchronous machine resulting from sudden changes in armature reaction, of negative-impedance means connected in series relation to said exciting winding for sustaining the currents induced by sudden changes in armature reaction, and auxiliary means including a vibratory regulator normally operative to maintain the current in said circuit at intermediate values between zero and the maximum value of which said negative-impedance means is capable.

11. The combination of an alternating-current system including a synchronous machine comprising an armature and a direct-current exciting winding, the current in which tends to follow variations in flux conditions in the synchronous machine resulting from sudden changes in armature reaction, a negative-resistance means in series with said exciting winding and developing a variable electromotive force responsive to currents induced in said exciting winding by changes in armature reaction.

12. The combination of an alternating-current system including a synchronous machine comprising an armature and a direct current exciting winding, the current in which tends to follow variations in flux conditions in the synchronous machine resulting from sudden changes in armature reaction, a source of excitation in series with said exciting winding responsive to currents induced in said exciting winding by changes in armature reaction, and regulating means normally operative to limit the range of operation of said source of excitation to intermediate exciting currents between zero and the maximum of which said source is capable.

13. The combination of an alternating-current system including a synchronous machine comprising an armature and a direct-current exciting winding, the current in which tends to follow variations in flux conditions in the synchronous machine resulting from sudden changes in armature reaction, a source of excitation in series with said exciting winding responsive to currents induced in said exciting winding by changes in armature reaction, and regulating means responsive to the voltage of said system for controlling the excitation within a normal operating range between zero exciting current and the maximum of which said source is capable.

In testimony whereof, I have hereunto subscribed my name this 25th day of August, 1921.

CHARLES LE G. FORTESCUE.